US012188373B1

(12) United States Patent
DiCintio et al.

(10) Patent No.: US 12,188,373 B1
(45) Date of Patent: Jan. 7, 2025

(54) COOLING CIRCUIT FOR A PLATFORM OF A STATOR VANE ASSEMBLY

(71) Applicant: GE Infrastructure Technology LLC, Greenville, SC (US)

(72) Inventors: Richard Martin DiCintio, Simpsonville, SC (US); Brad Wilson VanTassel, Greer, SC (US); Benjamin Paul Lacy, Greer, SC (US)

(73) Assignee: GE Infrastructure Technology LLC, Greenville, SC (US)

( * ) Notice: Subject to any disclaimer, the term of this patent is extended or adjusted under 35 U.S.C. 154(b) by 4 days.

(21) Appl. No.: 18/452,739

(22) Filed: Aug. 21, 2023

(51) Int. Cl.
*F01D 5/18* (2006.01)
*F01D 9/04* (2006.01)
*F01D 25/12* (2006.01)

(52) U.S. Cl.
CPC ............. *F01D 5/186* (2013.01); *F01D 9/041* (2013.01); *F01D 9/042* (2013.01); *F01D 25/12* (2013.01); *F05D 2240/14* (2013.01); *F05D 2240/81* (2013.01); *F05D 2260/201* (2013.01)

(58) Field of Classification Search
CPC .......... F05D 2240/81; F01D 9/04; F01D 9/41; F01D 9/42; F01D 9/44; F01D 9/06; F01D 9/065; F01D 25/12
See application file for complete search history.

(56) References Cited

U.S. PATENT DOCUMENTS 5,098,257 A * 3/1992 Hultgren .................. F01D 5/18 415/116
7,097,418 B2 8/2006 Trindade et al.
7,329,087 B2 * 2/2008 Cairo ...................... F01D 5/147 415/200
8,814,507 B1 * 8/2014 Campbell ............... F01D 25/12 415/173.1
8,961,108 B2 2/2015 Bergman et al.
10,358,927 B2 * 7/2019 Okajima ................... F01D 9/04
10,526,917 B2 * 1/2020 Anderson ............... F01D 9/041
10,989,068 B2 * 4/2021 Packer ..................... F01D 25/12
11,041,394 B2 * 6/2021 Walston .................. F01D 5/284
11,585,228 B2 * 2/2023 Galoul .................... F01D 9/065
11,834,962 B2 * 12/2023 Hada ....................... F01D 9/041
2007/0065285 A1 * 3/2007 Cairo ...................... F01D 5/147 416/193 A
2016/0201472 A1 * 7/2016 Okajima ................... F01D 9/04 29/889.7
2020/0025026 A1 * 1/2020 Packer .................. F01D 25/246
2022/0154589 A1 * 5/2022 Galoul .................. F01D 11/005

* cited by examiner

*Primary Examiner* — Woody A Lee, Jr.
*Assistant Examiner* — Wesley Le Fisher
(74) *Attorney, Agent, or Firm* — Dority & Manning, P.A.

(57) ABSTRACT

A platform for a stator vane assembly includes a main body that extends between a forward end and an aft end. The platform further includes an opening that is defined within the main body. The opening is configured to receive an airfoil segment of the stator vane assembly. A forward portion of the main body extends between the forward end and the opening. An aft portion of the main body extends between the opening and the aft end. A cooling circuit is defined within the platform. The cooling circuit includes a first plenum defined in the forward portion, and at least one re-use plenum defined in the aft portion and separated from the first plenum. The cooling circuit further includes a connecting channel that fluidly couples the first plenum and the at least one re-use plenum.

20 Claims, 7 Drawing Sheets

COOLING CIRCUIT FOR A PLATFORM OF A STATOR VANE ASSEMBLY

STATEMENT REGARDING FEDERALLY SPONSORED RESEARCH OR DEVELOPMENT

This invention was made with Government support under Contract No. DE-FE0031611 awarded by the United States Department of Energy. The Government has certain rights in this invention.

FIELD

The present disclosure relates generally to platforms for multi-piece stator vane assemblies. More particularly, the present disclosure relates a platform that defines a cooling circuit with forward and aft plenums connected to one another.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected, e.g., to a generator to produce electricity. The spent combustion gases then exit the gas turbine engine via the exhaust section.

During operation of the turbomachine, various hot gas path components in the system are subjected to high temperature flows, which can cause the hot gas path components to become stressed and possibly to fail prematurely. Since higher temperature flows generally result in increased performance, efficiency, and power output of the turbomachine, the hot gas path components that are subjected to high temperature flows must be cooled to allow the gas turbine system to operate with flows at increased temperatures.

As the maximum local temperature of the hot gas path components approaches the melting temperature of the hot gas path components, forced air cooling becomes necessary. For this reason, airfoils of turbine rotor blades and stationary nozzles often require complex cooling schemes in which air, typically bleed air from the compressor section, is forced through internal cooling passages within the airfoil and then discharged through cooling holes at the airfoil surface to transfer heat from the hot gas path component.

Many complex cooling schemes use small cooling passages, or micro-channels, to deliver cooling fluid through the airfoil (e.g., near the surface or wall of the airfoil). Such cooling schemes present a considerable fabrication challenge for cores and castings, which can significantly increase the manufacturing cost of the hot gas path components using such known near-wall cooling systems. To address the fabrication challenges with complex and/or small cooling channels near the component surface, many hot gas path components with such features may be additively manufactured. Additive manufacturing is capable of producing components with intricate and varied cooling features. However, additively manufacturing a hot gas path component, such as a rotor blade or stator vane, as a single component may be costly and time-consuming. Additionally, manufacturing errors in a single portion of the hot gas path component may result in the scrapping of the entire component.

As such, manufacturing a hot gas path component as multiple sub-components may be advantageous. However, manufacturing the hot gas path components as multiple sub-components creates cooling challenges because the cooling micro-channels within each of the sub-components cannot be fluidly coupled together. Additionally, if not properly cooled, the joints formed between the sub-components may be particularly weak and/or fail when exposed to the hot combustion gases produced during operation of the turbomachine.

Accordingly, an improved hot gas path component, having one or more subcomponents joined together and capable of being subject to hot combustion gases without risk of joint failure, is desired and would be appreciated in the art.

BRIEF DESCRIPTION

Aspects and advantages of the platforms and stator vanes in accordance with the present disclosure will be set forth in part in the following description, or may be obvious from the description, or may be learned through practice of the technology.

In accordance with one embodiment, a platform for a stator vane assembly is provided. The platform includes a main body that extends between a forward end and an aft end. The platform further includes an opening that is defined within the main body. The opening is configured to receive an airfoil segment of the stator vane assembly. A forward portion of the main body extends between the forward end and the opening. An aft portion of the main body extends between the opening and the aft end. A cooling circuit is defined within the platform. The cooling circuit includes a first plenum defined in the forward portion and at least one re-use plenum defined in the aft portion and separated from the first plenum. The cooling circuit further includes a connecting channel that fluidly couples the first plenum and the at least one re-use plenum.

In accordance with another embodiment, a stator vane assembly is provided. The stator vane assembly includes a platform and an airfoil segment. The airfoil segment includes an airfoil and a boss. The platform includes a main body that extends between a forward end and an aft end. The platform further includes an opening that is defined within the main body. The opening is configured to receive an airfoil segment of the stator vane assembly. A forward portion of the main body extends between the forward end and the opening. An aft portion of the main body extends between the opening and the aft end. A cooling circuit is defined within the platform. The cooling circuit includes a first plenum defined in the forward portion, and at least one re-use plenum defined in the aft portion and separated from the first plenum. The cooling circuit further includes a connecting channel that fluidly couples the first plenum and the at least one re-use plenum.

These and other features, aspects and advantages of the present platforms and stator vane assemblies will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present platforms and stator vanes, including the best mode of making and using the present systems and methods, directed to one of ordinary skill in the art, is set forth in the specification, which makes reference to the appended figures, in which.

DETAILED DESCRIPTION

Figure 1:
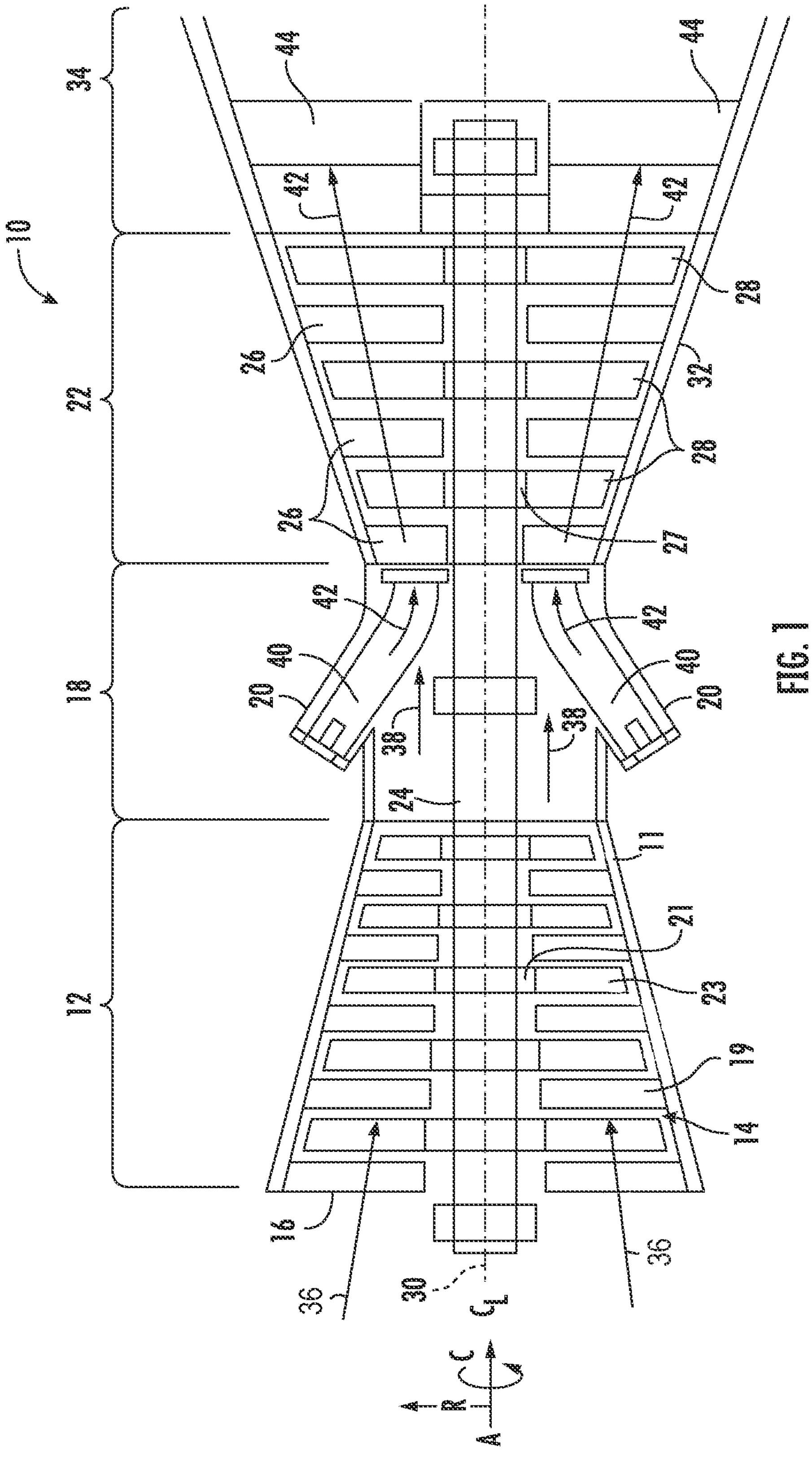
FIG. 1 is a schematic illustration of a turbomachine (e.g., a gas turbine engine), in accordance with embodiments of the present disclosure.

Reference now will be made in detail to embodiments of the present platforms and stator vanes, one or more examples of which are illustrated in the drawings. Each example is provided by way of explanation, rather than limitation of, the technology. In fact, it will be apparent to those skilled in the art that modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

The term "fluid" may be a gas or a liquid. The term "fluid communication" means that two or more areas defining a flow passage therein are joined to one another such that a fluid is capable of making the connection between the areas specified.

As used herein, the terms "upstream" (or "forward") and "downstream" (or "aft") refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

Terms of approximation, such as "about," "approximately," "generally," and "substantially," are not to be limited to the precise value specified. In at least some instances, the approximating language may correspond to the precision of an instrument for measuring the value, or the precision of the methods or machines for constructing or manufacturing the components and/or systems. In at least some instances, the approximating language may correspond to the precision of an instrument for measuring the value, or the precision of the methods or machines for constructing or manufacturing the components and/or systems. For example, the approximating language may refer to being within a 1, 2, 4, 5, 10, 15, or 20 percent margin in either individual values, range(s) of values, and/or endpoints defining range(s) of values. When used in the context of an angle or direction, such terms include within ten degrees greater or less than the stated angle or direction. For example, "generally vertical" includes directions within ten degrees of vertical in any direction, e.g., clockwise or counter-clockwise.

The terms "coupled," "fixed," "attached to," and the like refer to both direct coupling, fixing, or attaching, as well as indirect coupling, fixing, or attaching through one or more intermediate components or features, unless otherwise specified herein. The terms "directly coupled," "directly fixed," "directly attached to," and the like refer to a joining of two components without any intermediate components or features.

As used herein, the terms "comprises," "comprising," "includes," "including," "has," "having" or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "and/or" refers to a condition satisfied by any one of the following: A is true (or present) and B is false (or not present). A is false (or not present) and B is true (or present), and both A and B are true (or present).

Here and throughout the specification and claims, where range limitations are combinable and interchangeable, such ranges are identified and include all the sub-ranges contained therein unless context or language indicates otherwise. For example, all ranges disclosed herein are inclusive of the endpoints, and the endpoints are independently combinable with each other.

The term "proximate to" refers to being closer to one object or feature than an opposite object or feature. For example, when used in conjunction with first and second ends, high pressure and low pressure sides, leading and trailing edges, or the like, the phrases "proximate to the first end," or "proximate to the high pressure side," or "proximate to the leading edge" refer to a location closer to the first end than the second end, or closer to the high pressure side than the low pressure side, or closer to the leading edge than the trailing edge, respectively.

As used herein, the term "solid" may refer to a component that is free from voids, cavities, holes, or other openings, such that the component is impermeable and does not allow air or other fluids to pass therethrough.

Referring now to the drawings, FIG. 1 illustrates a schematic diagram of one embodiment of a turbomachine, which in the illustrated embodiment is a gas turbine engine 10. Although an industrial or land-based gas turbine engine is shown and described herein, the present disclosure is not limited to an industrial or land-based gas turbine engine, unless otherwise specified in the claims. For example, the invention as described herein may be used in any type of turbomachine including, but not limited to, a steam turbine, an aircraft gas turbine, or a marine gas turbine.

As shown in FIG. 1, the gas turbine engine 10 generally includes a compressor section 12. The compressor section 12 includes a compressor 14. The compressor 14 includes an inlet 16 that is disposed at an upstream end of the gas turbine engine 10. The gas turbine engine 10 further includes a combustion section 18 having one or more combustors 20 disposed downstream from the compressor section 12. The gas turbine engine 10 further includes a turbine section 22 (i.e., an expansion turbine) that is downstream from the combustion section 18. A shaft 24 extends generally axially through the gas turbine engine 10.

The compressor section 12 may generally include a plurality of rotor disks 21 and a plurality of rotor blades 23 extending radially outwardly from and connected to each rotor disk 21. Each rotor disk 21 in turn may be coupled to or form a portion of the shaft 24 that extends through the compressor section 12. The rotor blades 23 of the compressor section 12 may include turbomachine airfoils that define an airfoil shape (e.g., having a leading edge, a trailing edge, and side walls extending between the leading edge and the trailing edge). Additionally, in many embodiments, the compressor section 12 may include stator vanes 19 disposed between the rotor blades 23. The stator vanes 19 may extend from, and couple to, a compressor casing 11 that circumferentially surrounds an upstream portion of the shaft 24.

The turbine section 22 may generally include a plurality of rotor disks 27 and a plurality of rotor blades 28 extending radially outwardly from and being interconnected to each rotor disk 27. Each rotor disk 27 in turn may be coupled to or form a portion of the shaft 24 that extends through the turbine section 22. The turbine section 22 further includes an outer casing 32 that circumferentially surrounds the downstream portion of the shaft 24 and the rotor blades 28. The turbine section 22 may include stator vanes or stationary nozzles 26 extending radially inward from the outer casing 32. The rotor blades 28 and stator vanes 26 may be arranged in alternating fashion in stages along an axial centerline 30 of gas turbine 10. Both the rotor blades 28 and the stator vanes 26 may include turbomachine airfoils that define an airfoil shape (e.g., having a leading edge, a trailing edge, and side walls extending between the leading edge and the trailing edge).

In operation, ambient air 36 or other working fluid is drawn into the inlet 16 of the compressor 14 and is progressively compressed to provide compressed air 38 (or other working fluid) to the combustion section 18. The compressed air 38 flows into the combustion section 18 and is mixed with fuel to form a combustible mixture. The combustible mixture is burned within a combustion chamber 40 of the combustor 20, thereby generating combustion gases 42 that flow from the combustion chamber 40 into the turbine section 22. Energy (kinetic and/or thermal) is transferred from the combustion gases 42 to the rotor blades 28, causing the shaft 24 to rotate and produce mechanical work. The spent combustion gases 42 (also called "exhaust gases") exit the turbine section 22 and flow through the exhaust diffuser 34 across a plurality of struts or main airfoils 44 that are disposed within the exhaust diffuser 34.

The gas turbine engine 10 may define a cylindrical coordinate system having an axial direction A extending along the axial centerline 30, a radial direction R perpendicular to the axial centerline 30, and a circumferential direction C extending around the axial centerline 30.

Figure 2:
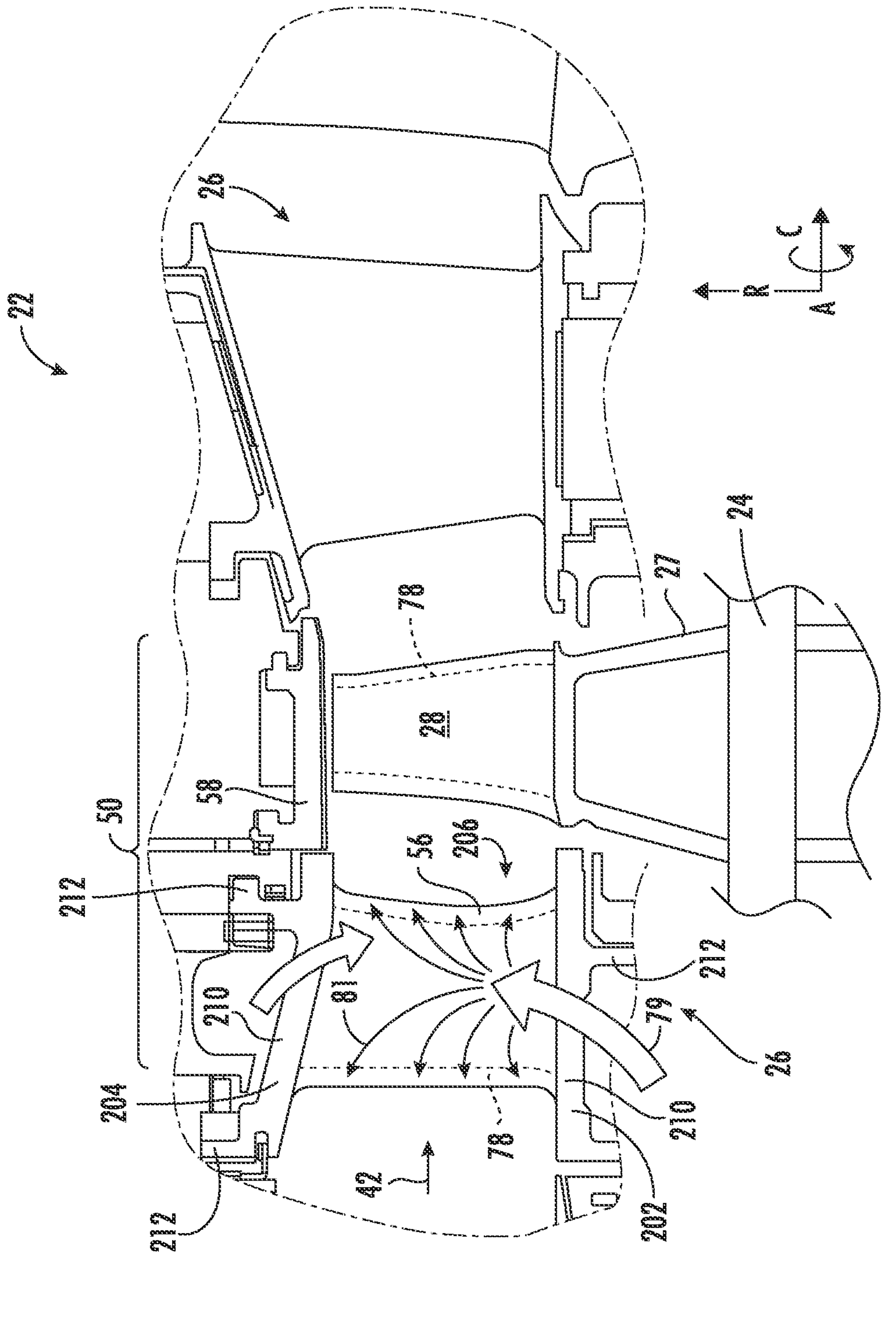
FIG. 2 illustrates a partial cross-sectional side view of a turbine section of a gas turbine engine as shown in FIG. 1, in accordance with embodiments of the present disclosure.

FIG. 2 is a partial cross-sectional side view of the turbine section 22 of the gas turbine engine 10, in accordance with embodiments of the present disclosure. The turbine section 22 may include one or more stages 50 that each include a set of rotor blades 28 coupled to a rotor disk 27 that may be rotatably attached to the shaft 24. The one or more stages 50 may further include a set of stator vanes 26. The stator vane 26 described herein may be employed in a first stage, a second stage, a third stage, a fourth stage, or multiple stages thereof, in which "first" refers to the stage immediately downstream of the combustion section 18.

Each stator vane 26 may include an airfoil segment 206 having an airfoil 56 that extends in the radial direction R between an inner platform or endwall 202 and an outer platform or endwall 204. The circumferentially adjacent outer platforms 204 of each stator vane 26 may be coupled together to form an outer annular ring extending around an inner annular ring formed by the circumferentially adjacent inner platforms 202 of each stator vane 26. The at least one airfoil 56 may extend between the two annular rings formed by the platforms 202, 204. The turbine section 22 may also include shroud segments 58, which may be disposed downstream of the outer platform 204 to direct combustion gases 42 flowing past the stator vanes 26 to the rotor blades 28.

As shown, the platforms 202, 204 may each include a main body 210 and one or more hook rails 212 extending radially outwardly from the main body 210. The one or more hook rails 212 may couple the platforms 202, 204 (thus coupling the stator vane assembly 26) to the turbine section 22. Particularly, the hook rails 212 may couple to a stationary structure of the turbine section 22, such as the turbine casing 32 described above with reference to FIG. 1.

Structures or components disposed along the flow path of the combustion gases 42 may be referred to as hot gas path components. In one example, the hot gas path component may be the stator vane 26 and/or the rotor blade 28. In some embodiments, to cool the hot gas path components, cooling features, such as impingement sleeves, cooling channels, cooling holes, etc. may be disposed within the hot gas path components, as indicated by the dashed line 78. For example, cooling air as indicated by an arrow 79 may be routed from the compressor section 12 or elsewhere and directed through the cooling features as indicated by arrows 81.

Figure 3:
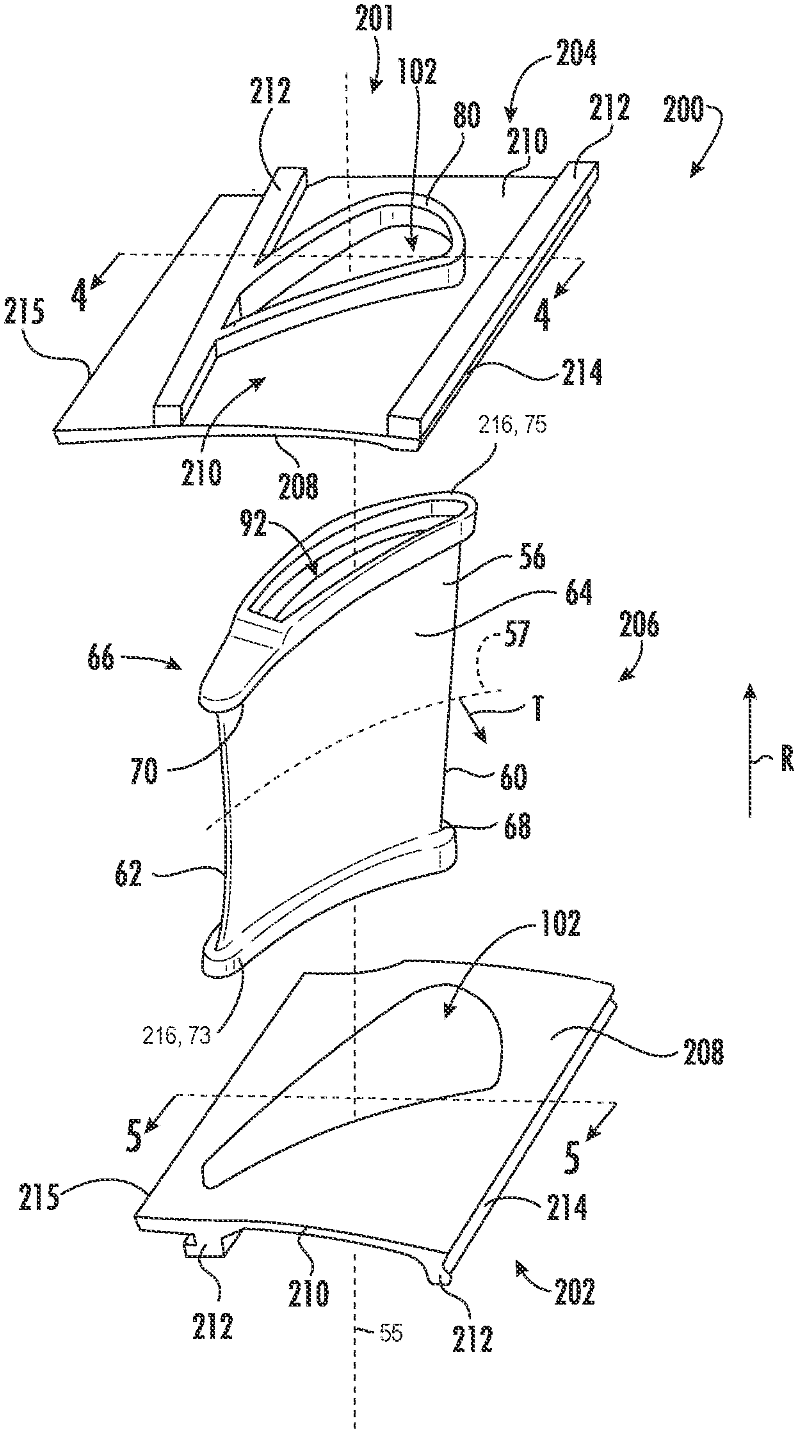
FIG. 3 illustrates an exploded view of a stator vane assembly, in accordance with embodiments of the present disclosure.

FIG. 3 illustrates an exploded view of a stator vane assembly 200, which may be representative of the stator vane 19 in the compressor section 12 and/or the stator vane 26 in the turbine section 22. However, in exemplary embodiments, the stator vane assembly 200 may be a stator vane 26 in the turbine section 22. As shown in FIG. 3, the stator vane assembly 200 includes a platform 201 and an airfoil segment 206. For example, the stator vane assembly 200 may include an inner platform 202, an outer platform 204, and the airfoil segment 206, which are separated from one another along an axial centerline 55 of the stator vane assembly 200 (i.e., illustrated in an exploded view), in order to illustrate various features of the stator vane assembly 200 that could not otherwise be seen when the assembly is constructed. The axial centerline 55 may be generally parallel to the radial direction of the gas turbine 10 when the stator vane assembly 200 is installed in the turbine section 22. The airfoil segment 206 may include an airfoil 56 that generally defines an aerodynamic shape or contour. For example, the airfoil 56 may include a leading edge 60 that engages a flow of combustion gases and side walls that guide the combustion gases along the airfoil 56 to a trailing edge 62. For example, the airfoil 56 may include a pressure side wall 64 and a suction side wall 66 that each extend from the leading edge 60 to the trailing edge 62. Additionally, the airfoil 56 may extend radially between a base 68 and a tip 70.

In exemplary embodiments, the inner platform 202, the airfoil 56, and the outer platform 204 may be separate components (e.g., manufactured as separate components) that are each coupled to the airfoil segment 206 (e.g., via a mechanical retention device and/or via a fixed coupling). The inner platform 202 may be coupled to an inner boss 75 of the airfoil segment 206, and the outer platform 204 may be coupled to an outer boss 73. In particular embodiments, the inner platform 202, the airfoil segment 206, and the outer platform 204 may each be separately additively manufactured (e.g., 3D printed) and subsequently joined to one another. Forming the stator vane assembly 200 as three separate components advantageously increases the repairability of the stator vane assembly 200. For example, if a portion of the airfoil segment 206 is damaged, then the entire stator vane assembly 200 would not need to be replaced. Rather, the mechanical connection could be undone (e.g., by removing the mechanical retention device) to decouple the airfoil segment 206 from the platforms 202, 204, and a new airfoil segment 206 could be employed or the old airfoil could be repaired.

Additionally, in instances where additive manufacturing is used to produce some portion of or all of the stator vane assembly 200, the build (i.e., print) time of the airfoil segment 206 as a separate component from the inner platform 202 and the outer platform 204 is significantly shorter as compared to the build time of an integral nozzle in which the inner and outer platforms 202, 204 are printed with the airfoil segment 206. Moreover, forming the stator vane assembly 200 from three separate components permits different manufacturing techniques and/or different materials to be used for the various components.

As shown in FIG. 3, the airfoil segment 206 may include a camber axis 57, which may extend from the leading edge 60 to the trailing edge 62 and which may be defined halfway between the pressure side wall 64 and the suction side wall 66 of the airfoil 56. The camber axis 57 may be curved and/or contoured to correspond with the curve of the pressure side wall 64 and the suction side wall 66. A transverse direction T may be defined orthogonally with respect to the camber axis 57.

As shown in FIG. 3, the airfoil segment 206 may further include a boss 216 extending from at least one of the base 68 or the tip 70 of the airfoil 56. The boss 216 may extend outwardly from the airfoil 56 in both the radial direction R and in the transverse direction T. For example, the stator vane assembly 200 may include an inner boss 73 that extends radially inwardly from the airfoil 56 at the base 68 and an outer boss 75 that extends radially outwardly from the airfoil 56 at the tip 70. Each boss 73, 75 may extend generally perpendicularly from the pressure side wall 64 and the suction side wall 66 in the transverse direction T.

Both the inner platform 202 and the outer platform 204 may define an opening 102. The boss 216 is disposed in the opening 102 of the platform 202, 204. The opening 102 may be sized and shaped to correspond with the respective boss 73, 75, such that the respective boss 73, 75 may be inserted into the opening 102 and subsequently connected to the respective platform 202, 204 (e.g., via the mechanical retention device and/or a fixed connection). Particularly, the inner boss 73 may be inserted into the opening 102 of the inner platform 202 (and subsequently connected to the inner platform 202), and the outer boss 75 may be inserted into the opening 102 of the outer platform 204 (and subsequently connected to the outer platform 204).

In many embodiments, as shown in FIG. 3, the inner platform 202 and/or the outer platform 204 may include a main body 210 that extends between a forward end 214 and an aft end 215. The main body 210 defines a hot gas boundary surface 208. The hot gas boundary surface 208 may extend generally perpendicularly to the airfoil 56. The hot gas boundary surface 208 of the inner platform 202 may define a radially inward flow boundary for combustion gases in the turbine section 22. Similarly, the hot gas boundary surface 208 of the outer platform 204 may define a radially outer flow boundary for combustion gases in the turbine section 22.

Additionally, the main body 210 of the inner platform 202 and the outer platform 204 may at least partially define the respective openings 102. In exemplary embodiments, one or both of the inner platform 202 and/or the outer platform 204 may include one or more protrusions 80 extending radially from the main body 210. The one or more protrusions 80 may at least partially define the opening 102. In many embodiments, the boss 216 may be coupled to the one or more protrusions 80. In many embodiments, the main body 210 may further include one or more hook rails 212 extending from the main body 210 opposite the hot gas boundary surface 208. In many embodiments, at least one hook rail 212 may extend across the opening 102.

In certain embodiments, the boss 216 that extends from the base 68 of the airfoil 56 may extend into the opening 102 of the inner platform 202. Similarly, the boss 216 that extends from the tip 70 of the airfoil 56 may extend into the opening 102 of the outer platform 204. In some embodiments, as shown, the boss 216 may at least partially define a cavity 92 that extends into and is further defined in the airfoil 56. The cavity 92 may be exposed by the opening 102 of the platform 54, such that air (e.g., bleed air from the compressor 14) may enter the cavity 92. In other embodiments (not shown), the boss 216 may be solid (i.e., no voids, cavities, or openings defined therein).

In operation, platforms 202, 204 may be exposed to extremely high temperature combustion gases, such that cooling the platforms 202, 204 is necessary to ensure the platforms 202, 204 do not get damaged or do not experience unacceptable thermal deformation due to the high temperatures.

Figure 4:
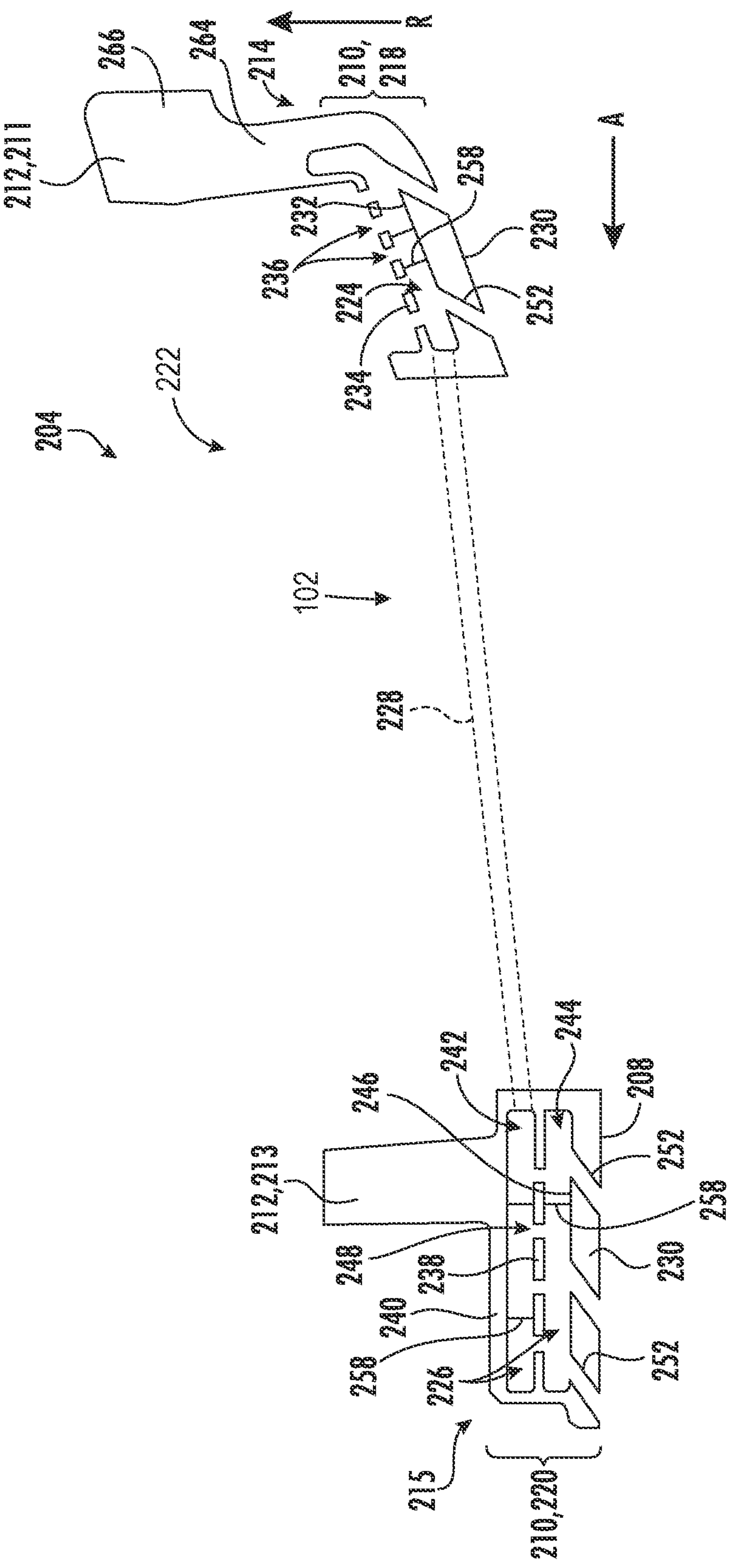
FIG. 4 schematically illustrates a cross-sectional view of a platform of the stator vane assembly from along the line 4-4 shown in FIG. 3, in accordance with embodiments of the present disclosure.
Figure 5:
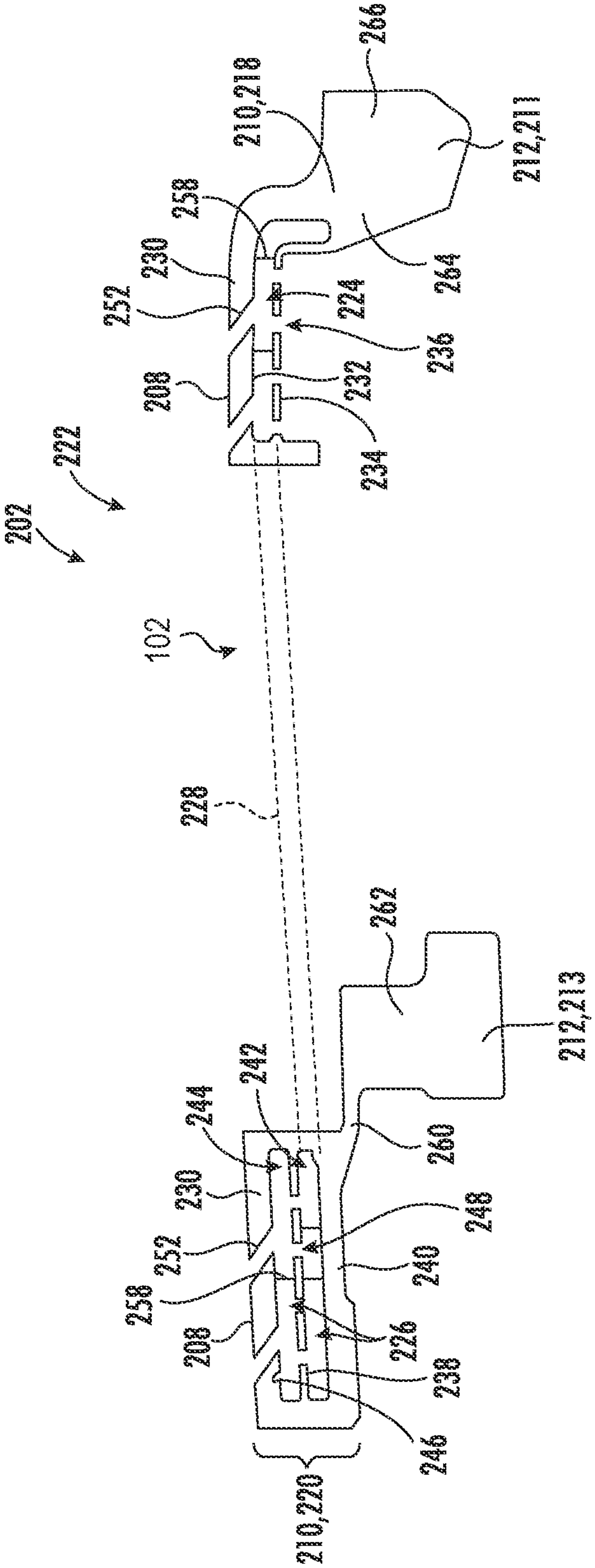
FIG. 5 schematically illustrates a cross-sectional view of a platform of the stator vane assembly from along the line 5-5 shown in FIG. 3, in accordance with embodiments of the present disclosure.

Referring now to FIGS. 4 and 5, where FIG. 4 illustrates a cross-sectional view of an outer platform 204 from along the line 4-4 shown in FIG. 3, and FIG. 5 illustrates a cross-sectional view of an inner platform 202 from along the line 5-5 shown in FIG. 3, in accordance with embodiments of the present disclosure. As shown, the platforms 202, 204 each include a main body 210 that extends between a forward end 214 and an aft end 215.

In many embodiments, the platforms 202, 204 may each define an opening 102 within the main body 210. The opening 102 may be configured to receive the airfoil segment 206, as discussed above with reference to FIG. 3. For example, the opening 102 may be airfoil-shaped (e.g., having a leading edge boundary, trailing edge boundary, a suction side boundary, and a pressure side boundary), such that the opening may receive the boss 216 of the airfoil segment 206. The opening 102 may divide, or separate, the main body 210 into a forward portion 218 and an aft portion 220. The forward portion 218 of the main body 210 may extend between the forward end 214 and the opening 102, and the aft portion 220 of the main body 210 may extend between the aft end 215 and the opening 102. In this way, the opening 102 may separate the forward portion 218 from the aft portion 220.

In exemplary embodiments, a cooling circuit 222 may be defined within each of the platforms 202, 204. The cooling circuit 222 may include a first plenum or forward plenum 224 defined in the forward portion 218 of the main body 210 and an at least one re-use plenum or aft plenum 226 defined in the aft portion 220 of the main body 210. While only one re-use plenum 226 is shown in the illustrated embodiments, the cooling circuit 222 may include any number of re-use plenums and should not be limited to any particular number of re-use plenums unless specifically recited in the claims. The aft plenum 226 may be separated from the forward plenum 224 (e.g., by the opening 102). In this way, the forward plenum 224 is not directly fluidly coupled to the aft plenum 226 (i.e., coolant cannot pass directly from the forward plenum 224 to the aft plenum 226). In various embodiments, the cooling circuit 222 may further include a connecting channel 228 that fluidly couples the forward plenum 224 and the aft plenum 226. Particularly, coolant may flow from the forward plenum 224, through the connecting channel 228, to the aft plenum 226.

In certain embodiments, the main body 210 may further include a boundary wall 230 that defines the hot gas boundary surface 208. The hot gas boundary surface 208 may be directly exposed to combustion gases during operation of the gas turbine engine 10, such that the boundary wall 230 may have a high localized temperature relative to other portions of the main body 210. As shown, the boundary wall 230 may include a first impingement surface 232 at the forward portion 218 of the main body 210 (opposite the hot gas boundary surface 208). The first impingement surface 232 may at least partially define the forward plenum 224. Further, in many embodiments, the forward portion 218 of the main body 210 may include a first impingement wall 234 that defines a first plurality of impingement apertures 236. The first plurality of impingement apertures 236 may extend through the first impingement wall 234 to provide for fluid communication to the forward plenum 224. In exemplary embodiments, the first plurality of impingement apertures 236 may be the inlet to the cooling circuit 222, such that coolant enters the cooling circuit 222 at the first plurality of impingement apertures 236.

In exemplary embodiments, the first plurality of impingement apertures 236 may be sized and oriented to direct coolant (such as compressed air from the compressor section 12) across the forward plenum 224 to impinge upon the first impingement surface 232. More specifically, the impingement apertures 236 may be sized and oriented to direct the pre-impingement air in discrete jets to impinge upon the impingement surface 232 of the boundary wall 230. The discrete jets of air impinge (or strike) the impingement surface 232 and create a thin boundary layer of air over the impingement surface 232, which allows for optimal heat transfer between the boundary wall 230 and the air. For example, the impingement apertures 236 may orient pre-impingement air such that the air is perpendicular to the surface upon which it strikes, e.g., the impingement surface 232 of the boundary wall 230.

Once the air has impinged upon the impingement surface 232, it may be referred to as "post-impingement air" and/or "spent cooling air" because the air has undergone an energy transfer and therefore has different characteristics. For example, the spent cooling air may have a higher temperature and lower pressure than the pre-impingement air because the spent cooling air has removed heat from the platform 202, 204 during the impingement process. However, as will be discussed below, the post-impingement air from the forward plenum 224 may advantageously travel through the connecting channel 228 and be re-used in the aft plenum 226 (e.g., the air may be utilized for impingement again in the aft plenum 226).

In various embodiments, the aft portion 220 of the main body 210 may further include a second impingement wall 238 and a solid wall 240. The second impingement wall 238 may be spaced apart (e.g., radially) from the solid wall 240 and the boundary wall 230. In this way, the second impingement wall 238 may separate the aft plenum 226 into a first portion 242 and a second portion 244. The first portion 242 of the aft plenum 226 may be defined between (e.g., radially) the solid wall 240 and the second impingement wall 238, and the second portion 244 may be defined between (e.g., radially) the second impingement wall 238 and a second impingement surface 246 of the boundary wall 230. In exemplary embodiments, the connecting channel 228 may fluidly couple (and extend between) the forward plenum 224 and the first portion 242 of the aft plenum 226.

As mentioned above, the boundary wall 230 may include a second impingement surface 246 at the aft portion 220 of the main body 210. The second impingement surface 246 may at least partially define the second portion 244 of the aft plenum 226. Additionally, the second impingement wall 238 may define a second plurality of impingement apertures 248 that fluidly couple the first portion 242 and the second portion 244. The second plurality of impingement apertures 248 may be sized and oriented to direct coolant across the second portion 244 of the aft plenum to impinge upon the second impingement surface 246. More specifically, the impingement apertures 248 may be sized and oriented to direct the re-use impingement air (e.g., the air that has already been used for impingement once) in discrete jets to impinge upon the second impingement surface 246 of the boundary wall 230. The plurality of impingement apertures 248 may be oriented generally perpendicularly to the impingement surface 246.

In many embodiments, the boundary wall 230 may define a film cooling channel 252 that extends from an inlet fluidly coupled to one of the forward plenum 224 or the aft plenum 226 to an outlet on the hot gas boundary surface 208. For example, the forward portion 218 of the main body 210 may include a plurality of film cooling channels 252 each extending from a respective inlet fluidly coupled to the forward plenum 224 to a respective outlet on the hot gas boundary surface 208. Similarly, the aft portion 220 of the main body 210 may include a plurality of film cooling channels 252 each extending from a respective inlet fluidly coupled to the second portion 244 of the aft plenum 226 to a respective outlet on the hot gas boundary surface 208.

In many embodiments, the outlet of the film cooling channel 252 may be aft (or downstream) of the inlet such that the film cooling channel 252 is oblique to the hot gas boundary surface 208 (i.e., forms an oblique angle with the hot gas boundary surface 208). The film cooling channels 252 may establish a layer of air between the hot combustion gases and the hot gas boundary surface 208 during operation of the gas turbine engine 10. That is, the film cooling channels 252 may eject air from the cooling circuit 222, which creates a film of cool air that flows over the hot gas boundary surface 208. The air absorbs some of the heat from the hot combustion gases, which helps to keep the temperature of the platform 202, 204 within a safe operating range.

In various embodiments, the platforms 202, 204 may further include a plurality of internal supports 258 extending across at least one of the forward plenum 224 and/or the aft plenum 224. The plurality of internal supports 258 do not fully block the flow of coolant within the plenums 224, 226 because the coolant is able to flow around the internal supports 258. The plurality of internal supports 258 may each extend radially within one of the plenums 224, 226 to provide additional structural support. For example, the supports 258 within the forward plenum may extend radially between (e.g., directly between) the boundary wall 230 and the first impingement wall 234. The supports 258 in the aft plenum 226 may extend radially between the solid wall 240 and the second impingement wall 238, or between the solid wall 240 and the boundary wall 230, or between the boundary wall 230 and the second impingement wall 238.

In various embodiments, the platforms 202, 204 may each include one or more hook rails 212 that extend radially from the main body 210. Particularly, the platforms 202, 204 may each include a forward hook rail 211 that extends radially from the forward portion 218 of the main body 210. Additionally, the platforms 202, 204 may each include an aft hook rail 213 that extends radially from the aft portion 220 of the main body 210. The forward hook rail 211 may include a radial portion 264 extending from the main body 210 and an axial protrusion 266 extending from the radial portion 262. In various embodiments, as shown, the forward plenum 224 may be defined at least partially in the radial portion 262 of the forward hook rail 211. The aft hook rail 213 of the inner platform 202 may include an axial tab 260 and a radial body 262. The axial tab 260 may extend from the solid wall 240 to the radial body 262.

Figure 6:
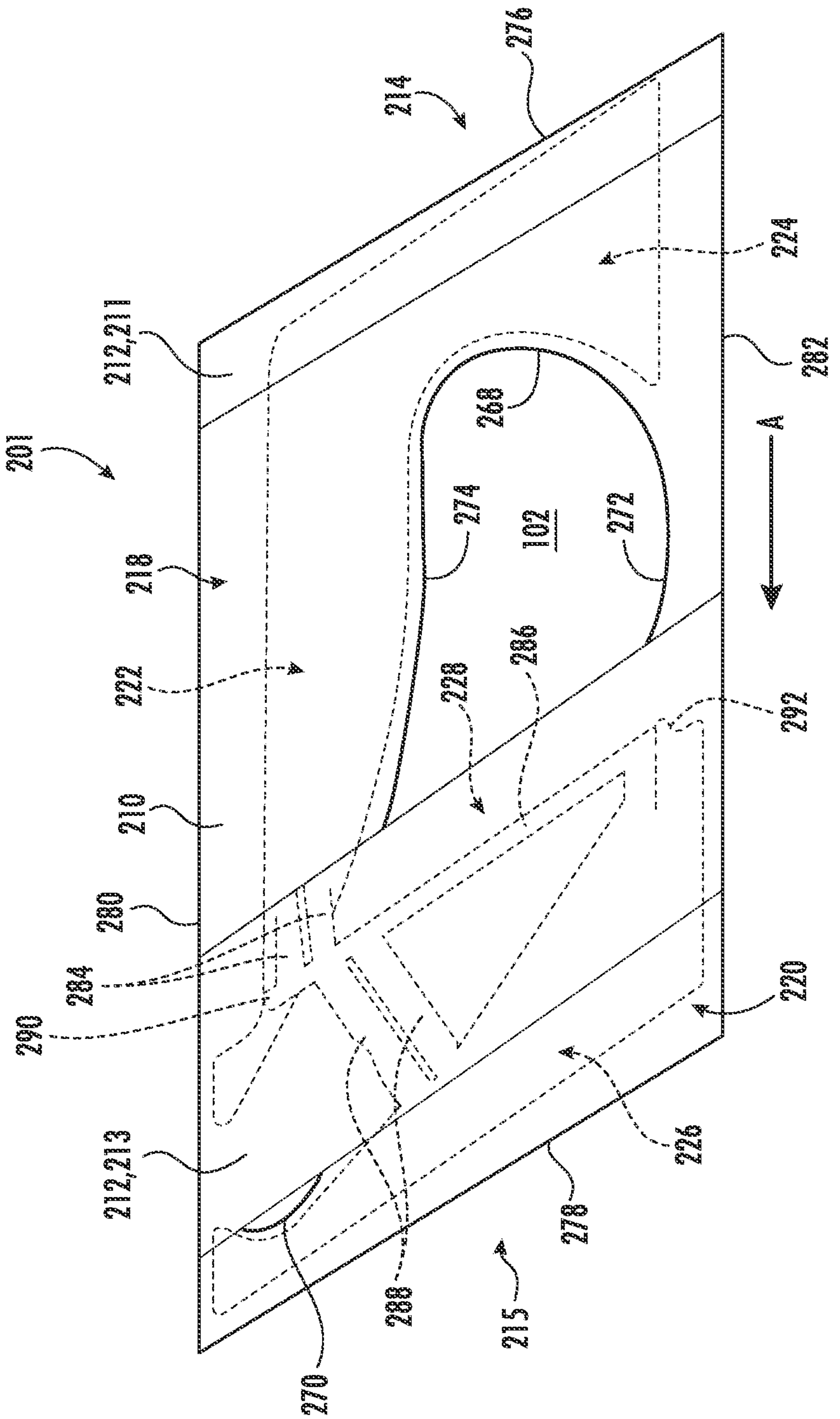
FIG. 6 schematically illustrates a top-down planar view of a platform of the stator vane assembly of FIG. 3, in accordance with embodiments of the present disclosure.

Referring now to FIG. 6, a top-down (overhead) planar view of a platform 201 (which may be the inner platform 202 and/or the outer platform 204 discussed above) of a stator vane assembly 200 is illustrated in accordance with embodiments of the present disclosure. As shown, the platform 201 may include a main body 210 and one or more hook rails 212 extending from the main body 210 (e.g., a forward hook rail 211 and an aft hook rail 213). As shown, the aft hook rail 213 may extend across the opening 102.

The main body 210 may define a leading edge face 276 and a trailing edge face 278 spaced apart from, and generally parallel to, the leading edge face 276. Additionally, the main body 210 may define a pressure side slash face 280 and a suction side slash face 282 spaced apart from, and generally parallel to, each other. The suction side slash face 282 and the pressure side slash face 280 may each extend between the leading edge face 276 and the trailing edge face 278. The hook rails 212 may extend between the pressure side slash face 280 and the suction side slash face 282. Additionally, the main body 210 may define an opening 102, as discussed previously, and the opening 102 may be airfoil shaped, such that the main body 210 defines a leading edge boundary 268, a trailing edge boundary 270, a suction side boundary 272, and a pressure side boundary 274 of the opening 102.

In exemplary embodiments, the platform 201 may include a cooling circuit 222 defined in the main body 210 and/or the hook rails 212 of the platform 201. For example, the cooling circuit 222 may include a forward plenum 224 and an aft plenum 226 defined within the main body 210. The forward plenum 224 and the aft plenum 226 may be spaced apart from one another such that the opening 102 is disposed between the forward plenum 224 and the aft plenum 226 (i.e., the opening 102 separates the plenums 224, 226). The forward plenum 224 may extend along (or proximate to) the leading edge face 276, a small portion of the suction side slash face 282, and a large portion (e.g., larger than the small portion) of the pressure side slash face 280. Additionally, the forward plenum 224 may extend along (or proximate to) a small portion of the suction side boundary 272, the leading edge boundary 268, and a large portion (e.g., larger than the small portion) of the pressure side boundary 274 of the opening 102.

The aft plenum 226 may extend along (or proximate to) the trailing edge face 278, a large portion of the suction side slash face 282, and a small portion (e.g., smaller than the large portion) of the pressure side slash face 280. Additionally, the aft plenum 226 may extend along (or proximate to) a large portion of the suction side boundary 272, the trailing edge boundary 270, and a small portion (e.g., smaller than the large portion) of the pressure side boundary 274.

In exemplary embodiments, the connecting channel 228 may be at least partially defined within the hook rail 212. Particularly, the connecting channel 228 may extend through the aft hook rail 213 and across the opening 102 to fluidly couple the forward plenum 224 to the aft plenum 226. In many embodiments, the connecting channel 228 may include one or more feed passages 284, a main connecting portion 286, and one or more outlet passages 288. The one or more feed passages 284 may extend between (and fluidly couple) the forward plenum 224 and the main connecting portion 286. The one or more outlet passages 288 may extend between (and fluidly couple) the main connecting portion 286 and the aft plenum 226. Additionally, or alternatively, the main connecting portion 286 of the connecting channel 228 may extend between a first end 290 fluidly coupled to the forward plenum 224 and a second end 292 fluidly coupled to the aft plenum 226. The first end 290 is proximate to the pressure side slash face 280, and the second end 292 is proximate to the suction side slash face 282.

Figure 7:
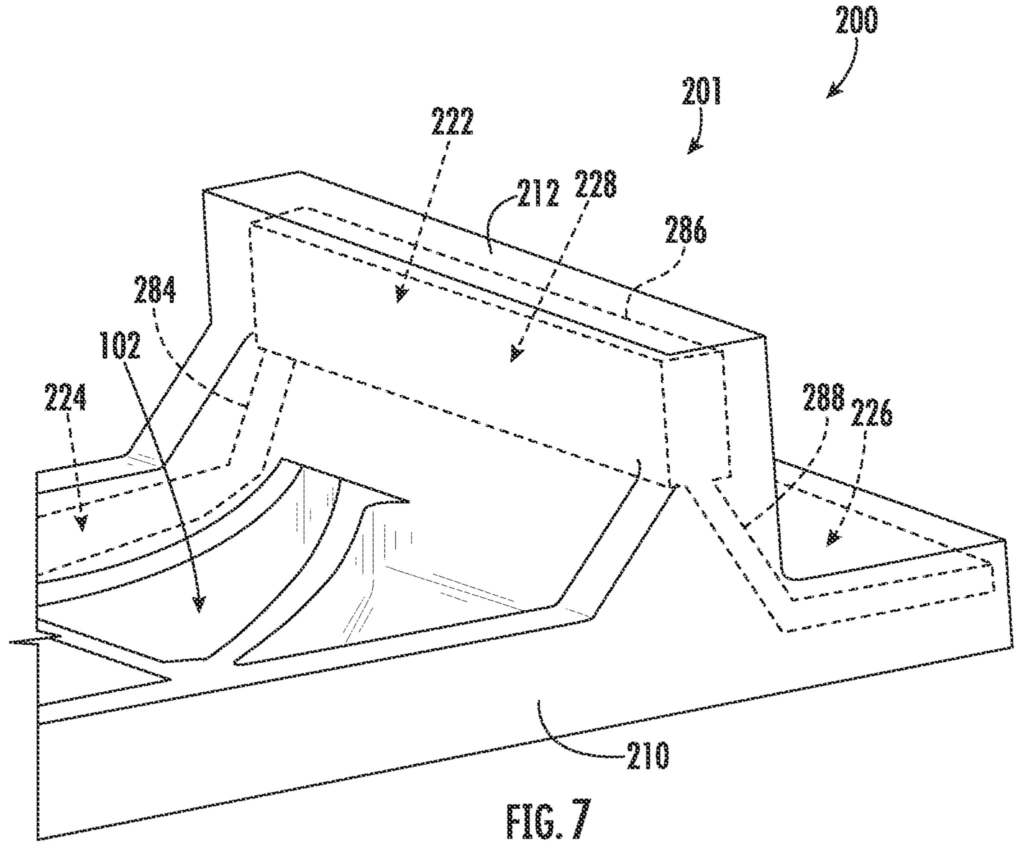
FIG. 7 is a perspective view of an aft portion of a platform of the stator vane assembly, in accordance with embodiments of the present disclosure.
Figure 8:
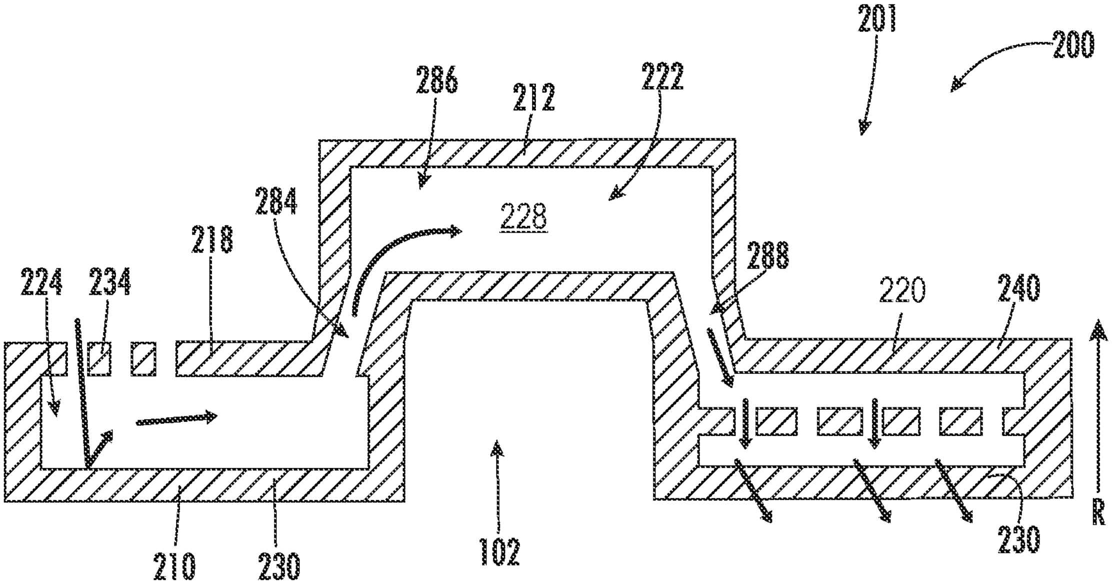
FIG. 8 is a schematic cross-sectional view of a cooling circuit disposed within a platform of a stator vane assembly, in accordance with embodiments of the present disclosure.

Referring now to FIGS. 7 and 8, various views of a platform 201 of a stator vane assembly 200 are illustrated in accordance with embodiments of the present disclosure. Particularly, FIG. 7 illustrates a perspective view of a portion of the platform 201, and FIG. 8 schematically illustrates a cross-sectional view of the platform 201. Notably, the cross-sectional view shown in FIG. 8 includes a separation, such that FIG. 8 illustrates features of the platform 201 in the same plane when these features are separated from each other, which is done for the purposes of discussion and clarity. Particularly, the hook rail 212 shown in FIG. 8 may extend into and out of the page, as shown in FIG. 7. As shown, the platform 201 may include a main body 210 that defines an opening 102, and the hook rail 212 may extend from the main body 210 (e.g., radially from the main body 210) and across the opening 102.

As shown, a cooling circuit 222 may be defined within the platform 201. The cooling circuit 222 may include a first plenum or forward plenum 224 defined in a forward portion 218 of the main body 210 and an at least one re-use plenum or aft plenum 226 defined in an aft portion 220 of the main body 210. The aft plenum 226 may be separated from the forward plenum 224 (e.g., by the opening 102). In this way, the forward plenum 224 is not directly fluidly coupled to the aft plenum 226 (i.e., coolant cannot pass directly from the forward plenum 224 to the aft plenum 226). In various embodiments, the cooling circuit 222 may further include a connecting channel 228 that fluidly couples the forward plenum 224 and the aft plenum 226. Particularly, coolant may flow from the forward plenum 224, through the connecting channel 228, to the aft plenum 226. In exemplary embodiments, as shown, the connecting channel 228 may be defined in the hook rail 212.

Additionally, as shown, the connecting channel 228 may include one or more feed passages 284, a main connecting portion 286, and one or more outlet passages 288. The one or more feed passages 284 may extend between (and fluidly couple) the forward plenum 224 and the main connecting portion 286. The one or more outlet passages 288 may extend between (and fluidly couple) the main connecting portion 286 and the aft plenum 226. The one or more feed passages 284 and the one or more outlet passages 288 may be angled with respect to the radial direction R (e.g., oblique with respect to the radial direction R). The main connecting portion 286 may extend between the one or more feed passages 284 on a first side of the opening 102 to the one or more outlet passages 288 on a second side of the opening 102. For example, the one or more feed passages 284 may be disposed proximate to the pressure side slash face 280, and the one or more outlet passages 288 may be disposed proximate to the suction side slash face 282.

The stator vane assemblies described herein advantageously provide for a multi-piece assembly that facilitates manufacturing at reduced cost and time when compared to a single piece assembly. Additionally, the platforms described herein advantageously include a cooling circuit that makes use of coolant at multiple locations for impingement and film cooling purposes, thereby increasing the overall hardware life of the stator vane assembly and platform.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims, or if they include equivalent structural elements with insubstantial differences from the literal language of the claims.

Further aspects of the invention are provided by the subject matter of the following clauses:

A platform for a stator vane assembly, the platform comprising: a main body extending between a forward end and an aft end; an opening defined within the main body, the opening configured to receive an airfoil segment of the stator vane assembly, wherein a forward portion of the main body extends between the forward end and the opening, and wherein an aft portion of the main body extends between the opening and the aft end; a cooling circuit defined within the platform, the cooling circuit comprising: a first plenum defined in the forward portion; at least one re-use plenum defined in the aft portion and separated from the first plenum; and a connecting channel fluidly coupling the first plenum and the at least one re-use plenum.

The platform as in any preceding clause, further comprising a hook rail extending from the main body and across the opening.

The platform as in any preceding clause, wherein the connecting channel is at least partially defined within the hook rail.

The platform as in any preceding clause, wherein the main body further comprises a boundary wall that defines a hot gas boundary surface.

The platform as in any preceding clause, wherein the forward portion of the main body further comprises a first impingement wall disposed within the first plenum, the first impingement wall defining a first plurality of impingement apertures.

The platform as in any preceding clause, wherein the boundary wall includes a first impingement surface at the forward portion of the main body, the first impingement surface at least partially defining the first plenum, and wherein the first plurality of impingement apertures is sized and oriented to direct coolant across the first plenum to impinge upon the first impingement surface.

The platform as in any preceding clause, wherein the boundary wall defines a film cooling channel that extends from an inlet fluidly coupled to one of the first plenum or the at least one re-use plenum to an outlet on the hot gas boundary surface, and wherein the outlet is offset from the inlet such that the film cooling channel is oblique to the hot gas boundary surface.

The platform as in any preceding clause, wherein the aft portion of the main body includes a second impingement wall disposed within the at least one re-use plenum, the second impingement wall separating the at least one re-use plenum into a first portion and a second portion, the second impingement wall defining a second plurality of impingement apertures fluidly coupling the first portion and the second portion.

The platform as in any preceding clause, wherein the connecting channel fluidly couples the first plenum to the first portion of the at least one re-use plenum.

The platform as in any preceding clause, wherein the aft portion of the main body includes a boundary wall having a second impingement surface, the second impingement surface at least partially defining the second portion of the at least one re-use plenum, and wherein the second plurality of impingement apertures is sized and oriented to direct coolant across the second portion of the at least one re-use plenum to impinge upon the second impingement surface.

The platform as in any preceding clause, further comprising a support extending within at least one of the first plenum and the at least one re-use plenum.

A stator vane assembly comprising: an airfoil segment having an airfoil and a boss; a platform comprising: a main body extending between a forward end and an aft end; an opening defined within the main body, the boss disposed in the opening of the platform, wherein a forward portion of the main body extends between the forward end and the opening, and wherein an aft portion of the main body extends between the opening and the aft end; a cooling circuit defined within the platform, the cooling circuit comprising: a first plenum defined in the forward portion; at least one re-use plenum defined in the aft portion and separated from the first plenum; and a connecting channel fluidly coupling the first plenum and the at least one re-use plenum.

The stator vane assembly as in any preceding clause, further comprising a hook rail extending from the main body and across the opening, and wherein the connecting channel is at least partially defined within the hook rail.

The stator vane assembly as in any preceding clause wherein the main body further comprises a boundary wall that defines a hot gas boundary surface.

The stator vane assembly as in any preceding clause, wherein the forward portion of the main body further comprises a first impingement wall disposed within the first plenum, the first impingement wall defining a first plurality of impingement apertures.

The stator vane assembly as in any preceding clause, wherein the boundary wall includes a first impingement surface at the forward portion of the main body, the first impingement surface at least partially defining the first plenum, and wherein the first plurality of impingement apertures is sized and oriented to direct coolant across the first plenum to impinge upon the first impingement surface.

The stator vane assembly as in any preceding clause, wherein the boundary wall defines a film cooling channel that extends from an inlet fluidly coupled to one of the first plenum or the at least one re-use plenum to an outlet on the hot gas boundary surface, and wherein the outlet is aft of the inlet such that the film cooling channel is oblique to the hot gas boundary surface.

The stator vane assembly as in any preceding clause, wherein the aft portion of the main body includes a second impingement wall disposed within the at least one re-use plenum, the second impingement wall separating the at least one re-use plenum into a first portion and a second portion, the second impingement wall defining a second plurality of impingement apertures fluidly coupling the first portion and the second portion.

The stator vane assembly as in any preceding clause, wherein the connecting channel fluidly couples the first plenum to the first portion of the at least one re-use plenum.

The stator vane assembly as in any preceding clause, wherein the aft portion of the main body includes a boundary wall having a second impingement surface, the second impingement surface at least partially defining the second portion of the at least one re-use plenum, and wherein the second plurality of impingement apertures is sized and oriented to direct coolant across the second portion of the at least one re-use plenum to impinge upon the second impingement surface.

What is claimed is:

1. A platform for a stator vane assembly, the platform comprising:
  - a main body extending between a forward end and an aft end;
  - an opening defined within the main body, the opening configured to receive an airfoil segment of the stator vane assembly, wherein a forward portion of the main body extends between the forward end and the opening, and wherein an aft portion of the main body extends between the opening and the aft end;
  - a hook rail extending from the main body and across the opening;
  - a cooling circuit defined within the platform, the cooling circuit comprising:
    - a first plenum defined in the forward portion;
    - at least one re-use plenum defined in the aft portion and separated from the first plenum; and
    - a connecting channel extending from the first plenum, through the hook rail and across the opening, to the at least one re-use plenum.

2. The platform as in claim 1, wherein the hook rail extends radially from the main body opposite of a hot gas path boundary surface.

3. The platform as in claim 1, wherein the main body further comprises a boundary wall that defines a hot gas boundary surface.

4. The platform as in claim 3, wherein the forward portion of the main body further comprises a first impingement wall disposed within the first plenum, the first impingement wall defining a first plurality of impingement apertures.

5. The platform as in claim 4, wherein the boundary wall includes a first impingement surface at the forward portion of the main body, the first impingement surface at least partially defining the first plenum, and wherein the first plurality of impingement apertures is sized and oriented to direct coolant across the first plenum to impinge upon the first impingement surface.

6. The platform as in claim 3, wherein the boundary wall defines a film cooling channel that extends from an inlet fluidly coupled to one of the first plenum or the at least one re-use plenum to an outlet on the hot gas boundary surface, and wherein the outlet is offset from the inlet such that the film cooling channel is oblique to the hot gas boundary surface.

7. The platform as in claim 1, wherein the aft portion of the main body includes a second impingement wall disposed within the at least one re-use plenum, the second impingement wall separating the at least one re-use plenum into a first portion and a second portion, the second impingement wall defining a second plurality of impingement apertures fluidly coupling the first portion and the second portion.

8. The platform as in claim 7, wherein the connecting channel fluidly couples the first plenum to the first portion of the at least one re-use plenum.

9. The platform as in claim 7, wherein the aft portion of the main body includes a boundary wall having a second impingement surface, the second impingement surface at least partially defining the second portion of the at least one re-use plenum, and wherein the second plurality of impingement apertures is sized and oriented to direct coolant across the second portion of the at least one re-use plenum to impinge upon the second impingement surface.

10. The platform as in claim 1, further comprising a support extending within at least one of the first plenum and the at least one re-use plenum.

11. The platform as in claim 1, wherein the connecting channel further comprises a feed passage, an outlet passage, and a main connecting portion, wherein the feed passage is disposed proximate a pressure side slash face of the platform, and wherein the outlet passage is disposed proximate a suction side slash face of the platform.

12. A stator vane assembly comprising:
  - an airfoil segment having an airfoil and a boss;
  - a platform comprising:
    - a main body extending between a forward end and an aft end;
    - an opening defined within the main body, the boss disposed in the opening of the platform, wherein a forward portion of the main body extends between the forward end and the opening, and wherein an aft portion of the main body extends between the opening and the aft end;

a hook rail extending from the main body and across the opening;

a cooling circuit defined within the platform, the cooling circuit comprising:

a first plenum defined in the forward portion;

at least one re-use plenum defined in the aft portion and separated from the first plenum; and a connecting channel extending from the first plenum, through the hook rail and across the opening, to the at least one re-use plenum.

13. The stator vane assembly as in claim 12, further comprising a hook rail extending wherein the hook rail extends radially from the main body opposite of a hot gas path boundary surface.

14. The stator vane assembly as in claim 12, wherein the main body further comprises a boundary wall that defines a hot gas boundary surface.

15. The stator vane assembly as in claim 14, wherein the forward portion of the main body further comprises a first impingement wall disposed within the first plenum, the first impingement wall defining a first plurality of impingement apertures.

16. The stator vane assembly as in claim 15, wherein the boundary wall includes a first impingement surface at the forward portion of the main body, the first impingement surface at least partially defining the first plenum, and wherein the first plurality of impingement apertures is sized and oriented to direct coolant across the first plenum to impinge upon the first impingement surface.

17. The stator vane assembly as in claim 14, wherein the boundary wall defines a film cooling channel that extends from an inlet fluidly coupled to one of the first plenum or the at least one re-use plenum to an outlet on the hot gas boundary surface, and wherein the outlet is aft of the inlet such that the film cooling channel is oblique to the hot gas boundary surface.

18. The stator vane assembly as in claim 12, wherein the aft portion of the main body includes a second impingement wall disposed within the at least one re-use plenum, the second impingement wall separating the at least one re-use plenum into a first portion and a second portion, the second impingement wall defining a second plurality of impingement apertures fluidly coupling the first portion and the second portion.

19. The stator vane assembly as in claim 18, wherein the connecting channel fluidly couples the first plenum to the first portion of the at least one re-use plenum.

20. The stator vane assembly as in claim 18, wherein the aft portion of the main body includes a boundary wall having a second impingement surface, the second impingement surface at least partially defining the second portion of the at least one re-use plenum, and wherein the second plurality of impingement apertures is sized and oriented to direct coolant across the second portion of the at least one re-use plenum to impinge upon the second impingement surface.

* * * * *